United States Patent
Tanaka et al.

(10) Patent No.: US 8,489,296 B2
(45) Date of Patent: Jul. 16, 2013

(54) CONTROLLER FOR AUTOMATIC TRANSMISSION

(75) Inventors: Naoto Tanaka, Okazaki (JP); Shinya Toyoda, Nissin (JP); Akira Hino, Toyota (JP); Yasunari Matsui, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 470 days.

(21) Appl. No.: 12/520,397

(22) PCT Filed: Dec. 10, 2008

(86) PCT No.: PCT/JP2008/072390
§ 371 (c)(1),
(2), (4) Date: Jun. 19, 2009

(87) PCT Pub. No.: WO2009/075283
PCT Pub. Date: Jun. 18, 2009

(65) Prior Publication Data
US 2010/0057316 A1    Mar. 4, 2010

(30) Foreign Application Priority Data
Dec. 13, 2007    (JP) ................................. 2007-321966

(51) Int. Cl.
*G06F 19/00* (2006.01)
(52) U.S. Cl.
USPC ......... 701/61; 701/67; 192/85.19; 192/103 F; 192/85.08; 477/50; 477/48; 474/28
(58) Field of Classification Search
USPC ...... 701/51, 60, 67, 61; 73/168, 1.01; 477/46, 477/50, 34, 48; 474/18, 28, 44; 192/85.19, 192/103 F, 85.08, 85.01
See application file for complete search history.

(56) References Cited

U.S. PATENT DOCUMENTS

| | | | |
|---|---|---|---|
| 2002/0025881 A1* | 2/2002 | Miyazaki et al. | 477/44 |
| 2002/0155922 A1* | 10/2002 | Okuwaki | 477/98 |
| 2006/0169036 A1* | 8/2006 | Eguchi et al. | 73/168 |
| 2006/0172829 A1* | 8/2006 | Ishio | 474/18 |
| 2006/0234828 A1 | 10/2006 | Iwatsuki et al. | |

(Continued)

FOREIGN PATENT DOCUMENTS

| | | |
|---|---|---|
| DE | 195 04 847 A1 | 9/1995 |
| DE | 602 05 398 T2 | 4/2006 |

(Continued)

OTHER PUBLICATIONS

Office Action dated Mar. 13, 2013, in German Patent Application No. 11 2008 000 211.8, filed Dec. 10, 2008.

*Primary Examiner* — Ronnie Mancho
(74) *Attorney, Agent, or Firm* — Oblon, Spivak, McClelland, Maier & Neustadt, L.L.P.

(57) ABSTRACT

In a controller for a belt-type continuously variable transmission including a hydraulic actuator that changes a groove width of a primary pulley, a hydraulic actuator that changes a groove width of a secondary pulley, and a belt clamping pressure control solenoid that controls the hydraulic pressure supplied to the hydraulic actuator of the secondary pulley, a mechanism calculates a transmission ratio between the primary pulley and the secondary pulley and determines whether or not there is belt slippage based on that calculated transmission ratio, and a mechanism determines normalcy of the belt clamping pressure control solenoid. The input torque when belt slippage has actually occurred, i.e., when a failure has been determined, is used as a condition when performing the normalcy determination. By setting such a condition, it is possible for a normalcy determination threshold value (input torque value $\alpha$) used for the normalcy determination to be a small value, and thus it is possible to suppress erroneous normalcy determination.

7 Claims, 11 Drawing Sheets

U.S. PATENT DOCUMENTS

| | | | |
|---|---|---|---|
| 2007/0099754 A1* | 5/2007 | Yamaguchi et al. | 477/44 |
| 2007/0118266 A1* | 5/2007 | Hino et al. | 701/51 |
| 2007/0142142 A1* | 6/2007 | Yamaguchi et al. | 474/28 |
| 2007/0298918 A1* | 12/2007 | Toyoda et al. | 474/28 |
| 2009/0055063 A1* | 2/2009 | Nakamura et al. | 701/60 |

FOREIGN PATENT DOCUMENTS

| | | |
|---|---|---|
| DE | 10 2005 058 511 A1 | 6/2007 |
| EP | 0 406 712 A2 | 1/1991 |
| JP | 2003 42276 | 2/2003 |
| JP | 2004 251359 | 9/2004 |
| JP | 2004 293652 | 10/2004 |
| JP | 2004 316861 | 11/2004 |
| JP | 2004 332879 | 11/2004 |
| JP | 2004 338679 | 12/2004 |
| JP | 2004 358999 | 12/2004 |
| JP | 2007 177833 | 7/2007 |

* cited by examiner

Fig. 9

| Gear | Engaging Element | | | | | |
|---|---|---|---|---|---|---|
| | C1 | C2 | B1 | B2 | B3 | F1 |
| 1st | Y | N | N | N | N | Y |
| 2nd | Y | N | Y | N | N | N |
| 3rd | Y | N | N | N | Y | N |
| 4th | Y | Y | N | N | N | N |
| 5th | N | Y | N | N | Y | N |
| 6th | N | Y | Y | N | N | N |
| Rev | N | N | N | Y | Y | N |

…

CONTROLLER FOR AUTOMATIC TRANSMISSION

TECHNICAL FIELD

The present invention relates to a controller for an automatic transmission mounted in a vehicle.

BACKGROUND ART

In a vehicle in which an engine is mounted, as a transmission that appropriately transmits torque and rotational velocity generated by an engine to drive wheels according to the running state of the vehicle, an automatic transmission that automatically sets an optimal transmission ratio between the engine and the drive wheels is known.

Automatic transmissions mounted in a vehicle include, for example, multi-speed automatic transmissions that set a transmission ratio (a gear ratio) using a planetary gear apparatus and frictionally engaging elements such as a clutch and a brake, and belt-type continuously variable transmissions (CVTs) that continuously adjust a transmission ratio.

In a vehicle in which a multi-speed automatic transmission has been mounted, a transmission (gearshift) map that has gearshift lines (gear switching lines) for obtaining an optimal gear according to the vehicle speed and an accelerator opening degree (or throttle opening degree) is stored in an ECU (Electronic Control Unit) or the like. A target gear is calculated based on the vehicle speed and the accelerator opening degree with reference to the gearshift map, and based on that target gear, a clutch, a brake, a one-way clutch, and so on, which are frictionally engaging elements, are engaged or released in a predetermined state, and thus the gearshift level (gear) is automatically set.

In the configuration of a belt-type continuously variable transmission, a belt is wrapped around a primary pulley (input side pulley) and a secondary pulley (output side pulley) that are provided with a pulley groove (V groove), and by reducing the groove width of one pulley while increasing the groove width of the other pulley, the contact radius (effective diameter) of the belt to each of the pulleys is continuously changed to steplessly set a transmission ratio. The torque transmitted in this belt-type continuously variable transmission corresponds to the load that acts in the direction that the belt and the pulleys are made to contact each other. Accordingly, the belt is clamped by the pulleys such that tension is applied to the belt.

Also, transmissioning of the belt-type continuously variable transmission, as described above, is performed by enlarging or shrinking the groove width of the pulley grooves. Specifically, the primary pulley and the secondary pulley are respectively configured using a fixed sieve and a movable sieve, and a transmission is performed by moving the movable sieve frontward/rearward in the axial direction with a hydraulic actuator provided on the back face side of the movable sieve.

In this sort of belt-type continuously variable transmission, for example as disclosed in below Patent Document 1, the transmission ratio is controlled using an upshift transmission control valve and a downshift transmission control valve. A line pressure is supplied to these two transmission control valves as a source pressure.

A duty solenoid valve (below, referred to as a duty solenoid) is connected to the upshift transmission control valve and the downshift transmission control valve, and the upshift transmission control valve and the downshift transmission control valve are switched according to a control hydraulic pressure that is output by the duty solenoid. Thus, an oil amount supplied to the hydraulic actuator of the primary pulley via the upshift transmission control valve is controlled, and the amount of oil discharged from the hydraulic actuator of the primary pulley via the downshift transmission control valve is controlled. By controlling the hydraulic pressure of the hydraulic actuator of the primary pulley in this way, the groove width of the primary pulley, i.e., the belt contact radius of the primary pulley side, changes, and thus the transmission ratio is controlled.

Also, a belt clamping pressure control valve is connected to the hydraulic actuator of the secondary pulley. Line pressure is supplied to the belt clamping pressure control valve, and by supplying that line pressure to the hydraulic actuator of the secondary pulley by controlling the control hydraulic pressure output by the linear solenoid valve (below, also referred to as a belt clamping pressure control solenoid) as a pilot pressure, the belt clamping pressure is controlled.

The line pressure used for the above transmission control and belt clamping pressure control is produced by using a line pressure control valve (primary regulator valve) to adjust the hydraulic pressure generated by an oil pump. The line pressure control valve is configured to operate using a control hydraulic pressure that is output by a linear solenoid valve for line pressure control (below, also referred to as a line pressure control solenoid) as a pilot pressure.

As technology related to belt slippage of the belt-type continuously variable transmission, there is the technology disclosed in below Patent Document 2. In the technology disclosed in Patent Document 2, in a continuously variable transmission, slippage of the continuously variable transmission is determined based on the results of comparing an actually occurring transmission ratio state of change to a target transmission ratio state of change.

Also, in below Patent Document 3, technology is disclosed in which when occurrence of slippage between a rotating member (drive pulley) and a torque transmitting member (driven pulley) has been determined, in a controller that reduces the input torque of the continuously variable transmission, based on the state of slippage after the input torque has been reduced, the input torque is returned from the reduced state.

Patent Document 1: JP 2007-177833A
Patent Document 2: JP 2004-251359A
Patent Document 3: JP 2003-42276A

DISCLOSURE OF INVENTION

Problem to be Solved by the Invention

In a controller for a belt-type continuously variable transmission, normalcy determination/abnormalcy determination of electrical components such as the belt clamping pressure control solenoid is performed. Specifically, a determination of whether or not there is belt slippage is made from the transmission ratio (transmission ratio between the primary pulley and the secondary pulley) of the belt-type continuously variable transmission, and when belt slippage is occurring, a determination of 'abnormal' is made. Also, after such an abnormalcy determination, a determination of 'normal' is made when a condition is established in which belt slippage is not occurring (normalcy return determination) when torque of at least an input torque value that is allowable at a minimum pressure when there is a solenoid failure has been input to the belt-type continuously variable transmission. The minimum pressure when there is a solenoid failure means a fixed minimum necessary hydraulic pressure when, for example, a belt clamping pressure control solenoid (normal open type) or a line pressure control solenoid (normal open type) fails in an ON state.

Incidentally, it is necessary to estimate the normalcy determination threshold value used for the actual normalcy determination as slightly higher than the input torque that is allowable at the minimum pressure when there is a solenoid failure, in consideration of a margin for solenoid hardware variation and preventing erroneous determination. Therefore, the normalcy determination threshold value becomes so high that determination is not possible during ordinary running (for example, such as during running under a low load). Therefore, in some cases it will not be possible to execute a normalcy determination process during ordinary running.

In such conditions, it may be impossible to make a determination of 'normal' even if the solenoid is in a state of normalcy, and so the accuracy of normalcy determination worsens. Also, if it is not possible to execute the normalcy determination process, it may not be possible to reliably perform clearing of an abnormalcy determination (normalcy return determination). For example, after abnormalcy has occurred for some reason (for example, valve sticking of a belt clamping pressure control valve), when the cause of that abnormalcy has been eliminated, it is necessary to clear the abnormalcy determination, but when a normalcy determination is not executed, it is not possible to clear the abnormalcy determination.

The same sort of problems as in the above belt-type continuously variable transmission occur also in a multi-speed automatic transmission when executing a determination process that determines normalcy/abnormalcy of the solenoid valve that controls supply/discharge of working oil to a hydraulic pressure servo of the frictionally engaging element by detecting whether or not there is slippage of a frictionally engaging element (for example, an input clutch).

The present invention was made in consideration of such circumstances, and it is an object thereof to provide a controller for automatic transmission that can reliably perform a normalcy determination of a solenoid valve for hydraulic pressure control.

Means for Solving Problem

In order to attain the above objective, the present invention provides a controller for automatic transmission having a solenoid valve that controls the hydraulic pressure of a transmission unit, the controller for automatic transmission being provided with a slippage determination means that determines slippage of a drive force transmission element of the transmission unit; an input torque calculation means that calculates input torque of the automatic transmission; and a normalcy determination means that determines normalcy of the solenoid valve; the input torque during slippage of the drive force transmission element being used as a condition when performing the normalcy determination. Specifically, the input torque during slippage of the drive force transmission element when slippage of the drive force transmission element has been determined by the slippage determination means is used as a condition in the normalcy determination means when performing the normalcy determination. Here, input torque during slippage of the drive force transmission element, as described above, means the input torque calculated by the input torque calculation means.

According to the invention, the input torque when slippage of a drive force transmission element has actually occurred (when failure has been determined) is used as a condition for a normalcy determination, so the normalcy determination threshold value can be a smaller value than in a conventional determination process. In other words, when the input torque when slippage has actually occurred is used as a condition when performing the normalcy determination, it is not necessary to consider the amount of solenoid hardware variation or the like, so the normalcy determination threshold value can be reduced by an amount corresponding to that hardware variation or the like. Also, by adopting a small value for the normalcy determination threshold value (input torque value) used for the normalcy determination, the actual input torque of the automatic transmission exceeds the normalcy determination threshold value even during ordinary running. Thus, it is possible to improve the accuracy of a normalcy return determination after a failure (abnormalcy) determination.

The following can be given as examples of the specific configuration of the invention.

As a specific configuration, assuming a controller for a belt-type continuously variable transmission having a primary pulley and a secondary pulley, a belt wrapped around the primary pulley and the secondary pulley, a hydraulic actuator that changes a groove width of the primary pulley, a hydraulic actuator that changes a groove width of the secondary pulley, and a solenoid valve (belt clamping pressure control solenoid) that controls the hydraulic pressure supplied to the hydraulic actuator of the secondary pulley, such a controller may be provided with a slippage determination means that determines whether or not there is belt slippage of the belt-type continuously variable transmission, an input torque calculation means that calculates input torque of the belt-type continuously variable transmission, and a normalcy determination means that determines normalcy of the solenoid valve, the input torque of the belt-type continuously variable transmission during belt slippage being used as a condition when performing the normalcy determination. In this configuration, if there is no belt slippage, when a greater torque than the input torque during belt slippage has been input to belt-type continuously variable transmission, a determination may be made that the solenoid valve (referred to below as a solenoid) is in a normal state.

According to the above configuration, the input torque when belt slippage has actually occurred, i.e., when failure has been determined, is used as a condition for the normalcy determination, so for the same reasons as given above, the input torque value (normalcy determination threshold value) used for the normalcy determination can be a small value. Thus, the actual input torque of the belt-type continuously variable transmission exceeds the normalcy determination threshold value even during ordinary running, so it is possible to suppress erroneous normalcy determination of the solenoid, and therefore the normalcy determination can be performed accurately. Thus, it is possible to reliably perform abnormalcy determination clearing after a failure (abnormalcy) determination.

As for the determination of whether or not there is belt slippage, for example, a means of calculating the transmission ratio between the primary pulley and the secondary pulley and determining whether or not there is belt slippage based on the calculated transmission ratio may be provided. In this case, a larger value (low side value) than the maximum transmission ratio of the belt-type continuously variable transmission may be set as a determination value, and a determination that there is belt slippage made when the calculated transmission ratio is at least that determination value.

As another specific configuration, assuming a controller for a multi-speed automatic transmission having a transmission unit that establishes a plurality of gears having different gear ratios by selectively engaging a plurality of frictionally engaging elements, and a solenoid valve that controls an engagement pressure of the frictionally engaging elements, such a controller may be provided with a slippage determination means that determines whether or not there is slippage of a frictionally engaging element, an input torque calculation means that calculates input torque of the multi-speed automatic transmission, and a normalcy determination means that determines normalcy of the solenoid valve, the input torque during slippage of the frictionally engaged element being used as a condition when performing the normalcy determination. In this configuration, if there is no slippage (clutch slippage) of the frictionally engaging element, when a greater torque than the input torque during slippage of the frictionally engaging element has been input to the multi-speed automatic transmission, a determination may be made that the solenoid valve (below, also referred to as a solenoid) is in a normal state.

According to this configuration, the input torque when slippage of the frictionally engaging element (clutch slippage) has actually occurred, i.e., when failure has been determined, is used as a condition for the normalcy determination, so for the same reasons as given above, the input torque value (normalcy determination threshold value) used for the normalcy determination can be a small value. Thus, the input torque of the multi-speed automatic transmission exceeds the normalcy determination threshold value even during ordinary running, so the normalcy determination can be performed reliably.

Also note that with respect to the determination of whether or not there is slippage of the frictionally engaging element, a configuration may be adopted in which a gear ratio based on input shaft revolutions and output shaft revolutions of the multi-speed automatic transmission in a specific gear (e.g., first gear) is calculated, and a determination as to whether or not there is slippage of the frictionally engaging element is made based on that calculated gear ratio. In this case, for example, the normal range of the gear ratio of the specific gear may be obtained through experimentation, calculation, and the like, and a determination may be made that there is slippage of the frictionally engaging element (that there is clutch slippage) when the calculated gear ratio is greater than the normal range.

Effects of the Invention

According to the invention, the input torque when slippage of a drive force transmission element has actually occurred (when failure has been determined) is used as a condition for a normalcy determination, so the normalcy determination threshold value can be a small value. Thus, because the actual input torque of the automatic transmission exceeds the normalcy determination threshold value even during ordinary running, it is possible to reliably perform a solenoid valve normalcy determination.

BRIEF DESCRIPTION OF DRAWINGS

FIG. 9 is an operation table of the automatic transmission shown in FIG. 8.

Figure 1:
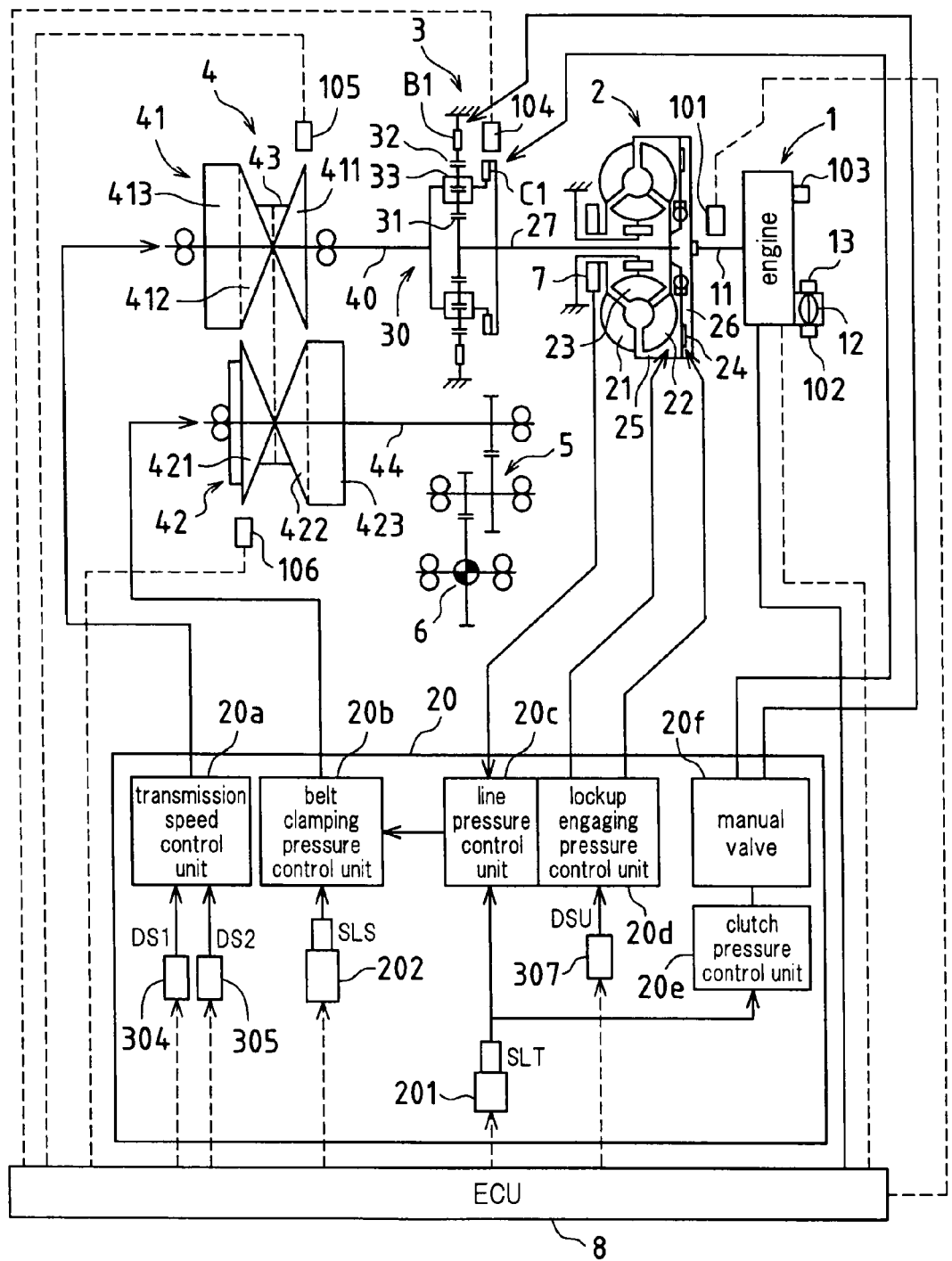
FIG. 1 is a schematic configuration view that shows an example of a vehicle in which has been mounted a belt-type continuously variable transmission in which the present invention is applied.

DESCRIPTION OF REFERENCE NUMERALS 1 engine
2 torque converter
3 forward/rearward travel switching apparatus
4 belt-type continuously variable transmission
41 primary pulley
413 hydraulic actuator
42 secondary pulley
423 hydraulic actuator
101 engine revolutions sensor
105 primary pulley revolutions sensor
106 secondary pulley revolutions sensor
20 hydraulic pressure control circuit
7 oil pump
8 ECU
201 linear solenoid (SLT)
202 linear solenoid (SLS)
203 primary regulator valve
301 upshift transmission control valve
302 downshift transmission control valve
303 belt clamping pressure control valve
700 automatic transmission
C1 first clutch (frictionally engaging element)
800 hydraulic pressure control circuit
801 linear solenoid (SL1)
924 input shaft revolutions sensor
925 output shaft revolutions sensor
1000 ECU

BEST MODE FOR CARRYING OUT THE INVENTION

Following is a detailed description of embodiments of the invention, with reference to the drawings.

Embodiment 1

FIG. 1 is a schematic configuration view of a vehicle in which the present invention is applied.

The vehicle in this example is a FF (front engine/front drive) type vehicle, in which an engine (internal combustion engine) 1 that is a travel power source, a torque converter 2 serving as a hydraulic power apparatus, a forward/rearward travel switching apparatus 3, a belt-type continuously variable transmission (CVT) 4, a deceleration gear apparatus 5, a differential gear apparatus 6, an ECU 8, and so on are mounted. A controller for automatic transmission is realized with the ECU 8, a hydraulic pressure control circuit 20 described below, a primary pulley revolutions sensor 105, a secondary pulley revolutions sensor 106, and so forth.

A crank shaft 11 that is an output shaft of the engine 1 is linked to the torque converter 2, and output of the engine 1 is transmitted from the torque converter 2 to the differential gear apparatus 6 via the forward/rearward travel switching apparatus 3, the belt-type continuously variable transmission 4, and the deceleration gear apparatus 5, and distributed to left and right drive wheels (not shown).

The engine 1, the torque converter 2, the forward/rearward travel switching apparatus 3, the belt-type continuously variable transmission 4, and the ECU 8 are each described below.

—Engine—

The engine 1 is, for example, a multi-cylinder gasoline engine. An intake air amount of air drawn into the engine 1 is controlled by an electronically controlled throttle valve 12. The throttle valve 12 is capable of electronically controlling a throttle opening degree independent from accelerator pedal operation of a driver, and that opening degree (throttle opening degree) is detected with a throttle opening degree sensor 102. Also, cooling water temperature of the engine 1 is detected with a water temperature sensor 103.

The throttle opening degree of the throttle valve 12 is driven/controlled with the ECU 8. Specifically, the throttle opening degree of the throttle valve 12 is controlled so as to obtain an optimal intake air amount (target intake amount) according to the operational state of the engine 1 such as an engine revolutions Ne detected by an engine revolutions sensor 101 and the driver's accelerator pedal depression amount (accelerator operation amount Acc). More specifically, the actual throttle opening degree of the throttle valve 12 is detected using the throttle opening degree sensor 102, and a throttle motor 13 of the throttle valve 12 is feedback-controlled such that the actual throttle opening degree matches the throttle opening degree that can obtain the target intake amount (target throttle opening degree).

—Torque Converter—

The torque converter 2 is provided with an input side pump impeller 21, an output side turbine runner 22, a stator 23 that realizes a torque amplification function, and the like, and transmits power between the pump impeller 21 and the turbine runner 22 via a fluid. The pump impeller 21 is linked to the crank shaft 11 of the engine 1. The turbine runner 22 is linked to the forward/rearward travel switching apparatus 3 via a turbine shaft 27.

In the torque converter 2, a lockup clutch 24 is provided that puts the input side and the output side of the torque converter 2 in a directly linked state. By controlling a differential pressure (lockup differential pressure) between the hydraulic pressure in an engaging side oil chamber 25 and the hydraulic pressure in a releasing side oil chamber 26, the lockup clutch 24 is completely engaged, half engaged (engagement in a slippage state), or released.

By completely engaging the lockup clutch 24, the pump impeller 21 and the turbine runner 24 rotate as a single body. Alternatively, by engaging the lockup clutch 24 in a predetermined slippage state (half engaged state), the turbine runner 22 rotates following the pump impeller 21 with a predetermined slippage amount during driving. On the other hand, the lockup clutch 24 is released by setting a negative lockup differential pressure.

Also, in the torque converter 2, a mechanical oil pump (hydraulic pressure generation source) 7 is provided that is driven while linked to the pump impeller 21.

—Forward/Rearward Travel Switching Apparatus—

The forward/rearward travel switching apparatus 3 is provided with a double pinion-type planetary gear mechanism 30, a forward clutch (input clutch) C1, and a rearward brake B1.

A sun gear 31 of the planetary gear mechanism 30 is linked as a single body to the turbine shaft 27 of the torque converter 2, and a carrier 33 is linked as a single body to an input shaft 40 of the belt-type continuously variable transmission 4. Also, the carrier 33 and the sun gear 31 are selectively linked via the forward clutch C1, and a ring gear 32 is selectively fixed to a housing via the rearward brake B1.

The forward clutch C1 and the rearward brake B1 are hydraulic pressure-type frictionally engaging elements that are engaged/released with a hydraulic pressure control circuit 20, described below. Due to the forward clutch C1 being engaged and the rearward brake B1 being released, the forward/rearward travel switching apparatus 3 rotates as a single body, and thus a forward power transmission path is established (attained), and in this state, drive force in the forward direction is transmitted to the belt-type continuously variable transmission 4 side.

On the other hand, when the rearward brake B1 is engaged and the forward clutch C1 is released, a rearward power transmission path is established (attained) with the forward/rearward travel switching apparatus 3. In this state, the input shaft 40 rotates in the opposite direction as the turbine shaft 27, and this drive force in the rearward direction is transmitted to the belt-type continuously variable transmission 4 side. Alternatively, when the forward clutch C1 and the rearward brake B1 are both released, the forward/rearward travel switching apparatus 3 enters a neutral state (blocked state) in which power transmission is blocked.

—Belt-Type Continuously Variable Transmission—

The belt-type continuously variable transmission 4 is provided with an input side primary pulley 41, an output side secondary pulley 42, and a metal belt 43 that is wrapped around the primary pulley 41 and the secondary pulley 42.

The primary pulley 41 is a variable pulley whose effective diameter is variable, and is configured with a fixed sieve 411 that is fixed to an input shaft 40 and a movable sieve 412 that is disposed on the input shaft 40 in a state so as to be slidable only in the axial direction. The secondary pulley 42 likewise is a variable pulley whose effective diameter is variable, and is configured with a fixed sieve 421 that is fixed to an output shaft 44 and a movable sieve 422 that is disposed on the output shaft 44 in a state so as to be slidable only in the axial direction.

A hydraulic actuator 413 for changing the V groove width between the fixed sieve 411 and the movable sieve 412 is disposed on the movable sieve 412 side of the primary pulley 41. Likewise, a hydraulic actuator 423 for changing the V groove width between the fixed sieve 421 and the movable sieve 422 is disposed on the movable sieve 422 side of the secondary pulley 42.

In the belt-type continuously variable transmission 4 with the above structure, by controlling the hydraulic pressure of the hydraulic actuator 413 of the primary pulley 41, the respective V groove widths of the primary pulley 41 and the secondary pulley 42 change, and thus the contact diameter (effective diameter) of the belt 43 changes, so that a transmission ratio γ (γ=primary pulley revolutions (input shaft revolutions) Nin/secondary pulley revolutions (output shaft revolutions) Nout) changes continuously. Also, the hydraulic pressure of the hydraulic actuator 423 of the secondary pulley 42 is controlled such that the belt 43 is clamped at a predetermined clamping pressure at which belt slippage does not occur. These controls are executed with the ECU 8 and the hydraulic pressure control circuit 20.

—Hydraulic Pressure Control Circuit—

As shown in FIG. 1, the hydraulic pressure control circuit 20 is configured with a transmission speed control unit 20a, a belt clamping pressure control unit 20b, a line pressure control unit 20c, a lockup engaging pressure control unit 20d, a clutch pressure control unit 20e, a manual valve 20f, and so on.

Also, control signals are supplied from the ECU 8 to a duty solenoid (DS1) 304 and a duty solenoid (DS2) 305 for transmission speed control, a linear solenoid (SLS) 202 for belt clamping pressure control, a linear solenoid (SLT) 201 for line pressure control, and a duty solenoid (DSU) 307 for lockup engaging pressure control, which constitute the hydraulic pressure control circuit 20.

Figure 2:
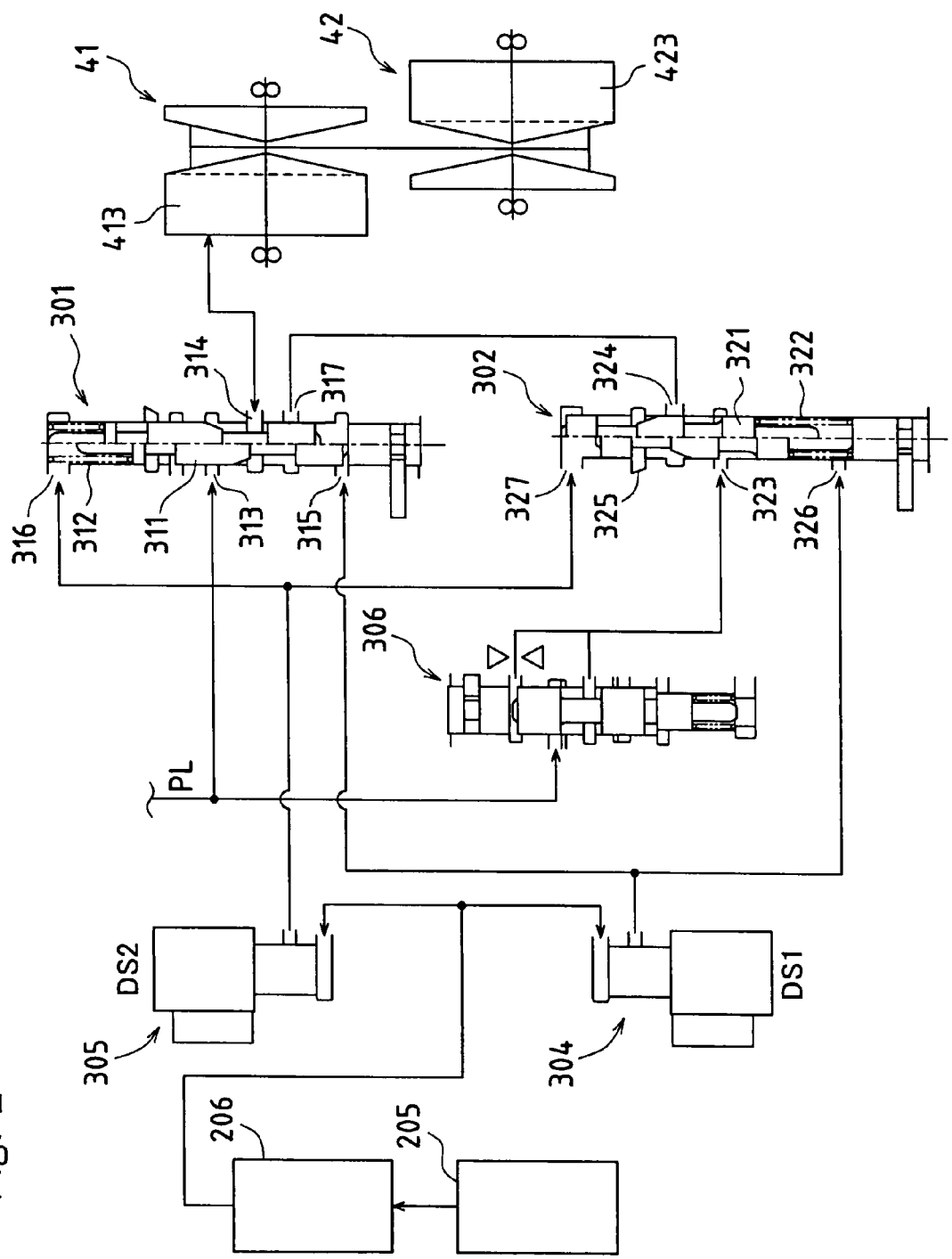
FIG. 2 is a circuit configuration view of, in a hydraulic pressure control circuit, a hydraulic pressure control circuit that controls a hydraulic actuator of a primary pulley of a belt-type continuously variable transmission.
Figure 3:
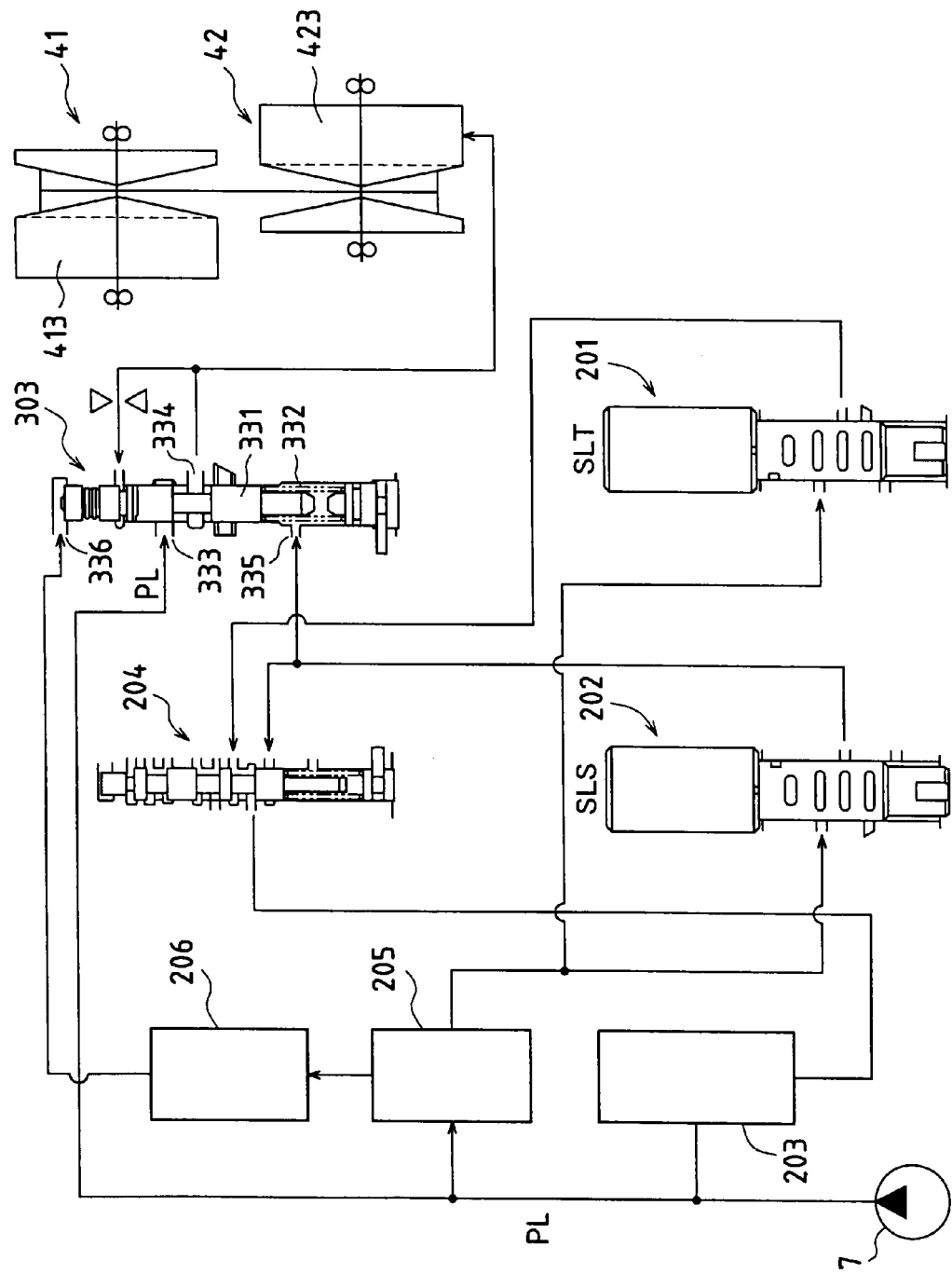
FIG. 3 is a circuit configuration view of, in a hydraulic pressure control circuit, a hydraulic pressure control circuit that controls belt clamping pressure of the belt-type continuously variable transmission.

Next, with reference to FIGS. 2 and 3, is a description of, among the hydraulic pressure control circuits 20, a hydraulic pressure control circuit (specific hydraulic pressure circuit configuration of the transmission speed control unit 20a) of the hydraulic actuator 413 of the primary pulley 41 of the belt-type continuously variable transmission 4, and a hydraulic pressure control circuit (specific hydraulic pressure circuit configuration of the belt clamping pressure control unit 20b) of the hydraulic actuator 423 of the secondary pulley 42.

First, as shown in FIG. 3, the hydraulic pressure generated by an oil pump 7 is adjusted by a primary regulator valve 203 to produce a line pressure PL. A control hydraulic pressure output by the linear solenoid (SLT) 201 is supplied to the primary regulator valve 203 via a clutch application control valve 204, and that control hydraulic pressure acts as a pilot pressure.

By switching of the clutch application control valve 204, the control hydraulic pressure from the linear solenoid (SLS) 202 is supplied to the primary regulator valve 203, and the line pressure PL may be adjusted by using that control hydraulic pressure as the pilot pressure. The hydraulic pressure adjusted with a modulator valve 205 using the line pressure PL as a source pressure is supplied to the linear solenoid (SLT) 201 and the linear solenoid (SLS) 202.

The linear solenoid (SLT) 201 outputs a control hydraulic pressure according to a current value determined with a duty signal (duty value) that has been sent from the ECU 8. The linear solenoid (SLT) 201 is a normally open-type solenoid valve.

Also, the linear solenoid (SLS) 202 outputs a control hydraulic pressure according to a current value determined with a duty signal (duty value) that has been sent from the ECU 8. Like the above linear solenoid (SLT) 201, the linear solenoid (SLS) 202 also is a normally open-type solenoid valve.

Note that in the hydraulic pressure control circuits shown in FIGS. 2 and 3, a modulator valve 206 adjusts the hydraulic pressure output by the modulator valve 205 to a fixed pressure, and supplies the adjusted hydraulic pressure to the below-described duty solenoid (DS1) 304, duty solenoid (DS2) 305, a belt clamping pressure control valve 303, and so on.

[Transmission Speed Control]

Next is a description of the hydraulic pressure control circuit of the hydraulic actuator 413 of the primary pulley 41.

As shown in FIG. 2, an upshift transmission control valve 301 is connected to the hydraulic actuator 413 of the primary pulley 41.

In the upshift transmission control valve 301, a spool 311 is provided that can move in the axial direction. A spring 312 is disposed at one end (the upper end in FIG. 2) of the spool 311, and a first hydraulic pressure port 315 is formed at the opposite end from the spring 312, sandwiching the spool 311. Also, a second hydraulic pressure port 316 is formed at the end where the spring 312 is disposed.

The duty solenoid (DS1) 304, which outputs a control hydraulic pressure according to a current value determined with a duty signal (duty value) that has been sent from the ECU 8, is connected to the first hydraulic pressure port 315, and the control hydraulic pressure output by the duty solenoid (DS1) 304 is applied to the first hydraulic pressure port 315. The duty solenoid (DS2) 305, which outputs a control hydraulic pressure according to a current value determined with a duty signal (duty value) that has been sent from the ECU 8, is connected to the second hydraulic pressure port 316, and the control hydraulic pressure output by the duty solenoid (DS2) 305 is applied to the second hydraulic pressure port 316.

Further, in the upshift transmission control valve 301, an input port 313 where the line pressure PL is supplied, an input/output port 314 connected to (in communication with) the hydraulic actuator 413 of the primary pulley 41, and an output port 317 are formed. When the spool 311 is in an upshift position (right side position in FIG. 2), the output port 317 is closed, and line pressure PL is supplied from the input port 313 to the hydraulic actuator 413 of the primary pulley 41 via the input/output port 314. On the other hand, when the spool 311 is in a closed position (left side position in FIG. 2), the input port 313 is closed, and the hydraulic actuator 413 of the primary pulley 41 is in communication with the output port 317 via the input/output port 314.

A spool 321 that is movable in the axial direction is provided in a downshift transmission control valve 302. A spring 322 is disposed at one end (the lower end in FIG. 2) of the spool 321, and a first hydraulic pressure port 326 is formed at that end. Also, a second hydraulic pressure port 327 is formed at the opposite end from the spring 322, sandwiching the spool 321. The duty solenoid (DS1) 304 is connected to the first hydraulic pressure port 326, and the control hydraulic pressure output by the duty solenoid (DS1) 304 is applied to the first hydraulic pressure port 326. The duty solenoid (DS2) 305 is connected to the second hydraulic pressure port 327, and the control hydraulic pressure output by the duty solenoid (DS2) 305 is applied to the second hydraulic pressure port 327.

Further, an input port 323, an input/output port 324 and a discharge port 325 are formed in the downshift transmission control valve 302. A bypass control valve 306 is connected to the input port 323, and a hydraulic pressure obtained by adjusting the line pressure PL at the bypass control valve 306 is supplied.

In this sort of downshift transmission control valve 302, the input/output port 324 is in communication with the discharge port 325 when the spool 321 is in the downshift position (left side position in FIG. 2). On the other hand, the input/output port 324 is closed when the spool 321 is in the closed position (right side position in FIG. 2). Also, the input/output port 324 of the downshift transmission control valve 302 is connected to the output port 317 of the upshift transmission control valve 301.

In the above hydraulic pressure control circuit of FIG. 2, when the control hydraulic pressure output by the duty solenoid (DS1) 304 is supplied to the first hydraulic pressure port 315 of the upshift transmission control valve 301, the spool 311 moves to the upshift position side (upper side in FIG. 2) due to thrust corresponding to that control hydraulic pressure. Due to movement (movement to the upshift side) of the spool 311, working oil (the line pressure PL) is supplied from the input port 313 via the input/output port 314 to the hydraulic actuator 413 of the primary pulley 41 at a flow amount corresponding to the control hydraulic pressure, and the output port 317 is closed so that the working oil is prevented from flowing through to the downshift transmission control valve 302. Thus, the transmission control pressure is increased, the V groove width of the primary pulley 41 is reduced, and so the transmission ratio $\gamma$ is reduced (upshift).

When the control hydraulic pressure output by the duty solenoid (DS1) 304 is supplied to the first hydraulic pressure port 326 of the downshift transmission control valve 302, the spool 321 moves to upper side in FIG. 2, and so the input/output port 324 is closed.

On the other hand, when the control hydraulic pressure output by the duty solenoid (DS2) 305 is supplied to the second hydraulic pressure port 316 of the upshift transmission control valve 301, the spool 311 moves to the downshift position side (lower side in FIG. 2) due to thrust corresponding to that control hydraulic pressure. Due to movement (movement to the downshift side) of the spool 311, working oil in the hydraulic actuator 413 of the primary pulley 41 flows into the input/output port 314 of the upshift transmission control valve 301 at a flow amount corresponding to the control hydraulic pressure. The working oil that flowed into the upshift transmission control valve 301 is discharged from the discharge port 325 via the output port 317 and the input/output port 324 of the downshift transmission control valve 302. Thus, the transmission control pressure is reduced, the V groove width of the input side variable pulley 42 is increased, and so the transmission ratio $\gamma$ is increased (downshift).

When the control hydraulic pressure output by the duty solenoid (DS2) 305 is supplied to the second hydraulic pressure port 327 of the downshift transmission control valve 302, the spool 321 moves to lower side in FIG. 2, so that the input/output port 324 and the discharge port 325 are in communication.

When, as described above, control hydraulic pressure is output from the duty solenoid (DS1) 304, working oil from the upshift transmission control valve 301 is supplied to the hydraulic actuator 413 of the primary pulley 41, and the transmission control pressure is continuously upshifted. Alternatively, when control hydraulic pressure is output from the duty solenoid (DS2) 305, working oil in the hydraulic actuator 413 of the primary pulley 41 is discharged from the discharge port 325 of the downshift transmission control valve 302, and the transmission control pressure is continuously downshifted.

Figure 4:
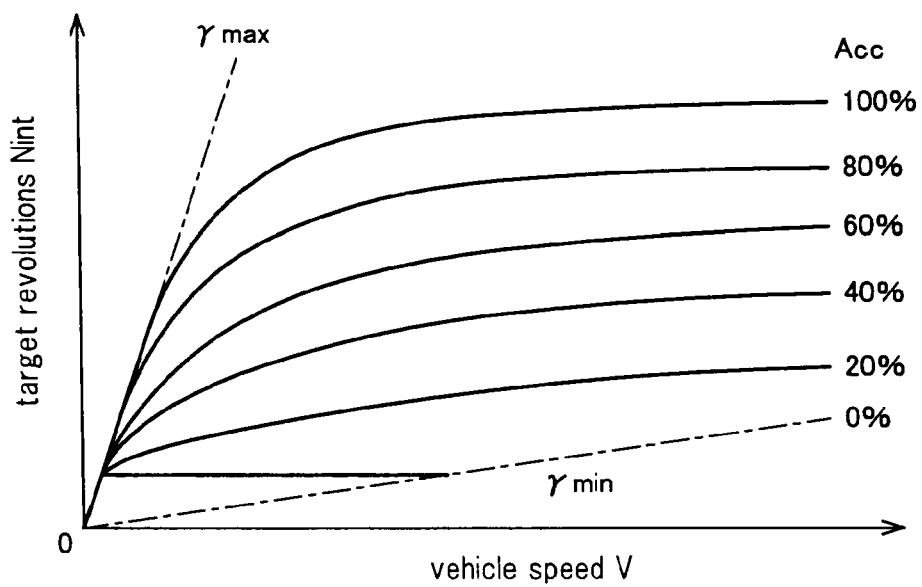
FIG. 4 shows an example of a map used for transmission control of the belt-type continuously variable transmission.

In this example, for example as shown in FIG. 4, an input side target revolutions Nint is calculated from a preset transmission map using an accelerator operation amount Acc that indicates the driver's requested output and a vehicle speed V as parameters, and transmission control of the belt-type continuously variable transmission 4 is performed such that an actual input shaft revolutions Nin matches the target revolutions Nint, according to the difference between those revolutions (Nint−Nin). That is, transmission control pressure is controlled by supply/discharge of working oil to/from the hydraulic actuator 413 of the primary pulley 41, and thus the transmission ratio $\gamma$ changes continuously. The map in FIG. 4 corresponds to transmission conditions, and is stored in a ROM 82 of the ECU 8 (see FIG. 6).

In the map in FIG. 4, the target revolutions Nint is set such that the transmission ratio $\gamma$ increases as the vehicle speed V decreases and the accelerator operation amount Acc increases. Also, because the vehicle speed V corresponds to the secondary pulley revolutions (output shaft revolutions) Nout, the target revolutions Nint that is the target value of the primary pulley revolutions (input shaft revolutions) Nin corresponds to the target transmission ratio, and is set within the range of a minimum transmission ratio $\gamma$min and a maximum transmission ratio $\gamma$max of the belt-type continuously variable transmission 4.

[Belt Clamping Pressure Control]

Next is a description of a hydraulic pressure control circuit of the hydraulic actuator 423 of the secondary pulley 42, with reference to FIG. 3.

As shown in FIG. 3, the belt clamping pressure control valve 303 is connected to the hydraulic actuator 423 of the secondary pulley 42.

In the belt clamping pressure control valve 303, a spool 331 is provided that can move in the axial direction. A spring 332 is disposed at one end (the lower end in FIG. 3) of the spool 331, and a first hydraulic pressure port 335 is formed at that end. Also, a second hydraulic pressure port 336 is formed at the opposite end from the spring 332, sandwiching the spool 331.

The linear solenoid (SLS) 202 is connected to the first hydraulic pressure port 335, and control hydraulic pressure output by the linear solenoid (SLS) 202 is applied to the first hydraulic pressure port 335. Hydraulic pressure from the modulator valve 206 is applied to the second hydraulic pressure port 336.

Further, in the belt clamping pressure control valve 303, an input port 333 where the line pressure PL is supplied, and an output port 334 connected to (in communication with) the hydraulic actuator 423 of the secondary pulley 42, are formed.

In the hydraulic pressure control circuit in FIG. 3, from a state in which a predetermined hydraulic pressure is being supplied to the hydraulic actuator 423 of the secondary pulley 42, when the control hydraulic pressure output by the linear solenoid (SLS) 202 increases, the spool 331 of the belt clamping pressure control valve 303 moves to the upper side in FIG. 3. In this case, the hydraulic pressure supplied to the hydraulic actuator 423 of the secondary pulley 42 increases, and the belt clamping pressure increases.

On the other hand, from a state in which a predetermined hydraulic pressure is being supplied to the hydraulic actuator 423 of the secondary pulley 42, when the control hydraulic pressure output by the linear solenoid (SLS) 202 decreases, the spool 331 of the belt clamping pressure control valve 303 moves to the lower side in FIG. 3. In this case, the hydraulic pressure supplied to a hydraulic pressure cylinder of the secondary pulley 42 decreases, and the belt clamping pressure decreases.

In this way, the line pressure PL is adjusted/controlled using the control hydraulic pressure output by the linear solenoid (SLS) 202 as a pilot pressure, and the belt clamping pressure increases/decreases due to supplying the adjusted line pressure PL to the hydraulic actuator 423 of the secondary pulley 42.

Figure 5:
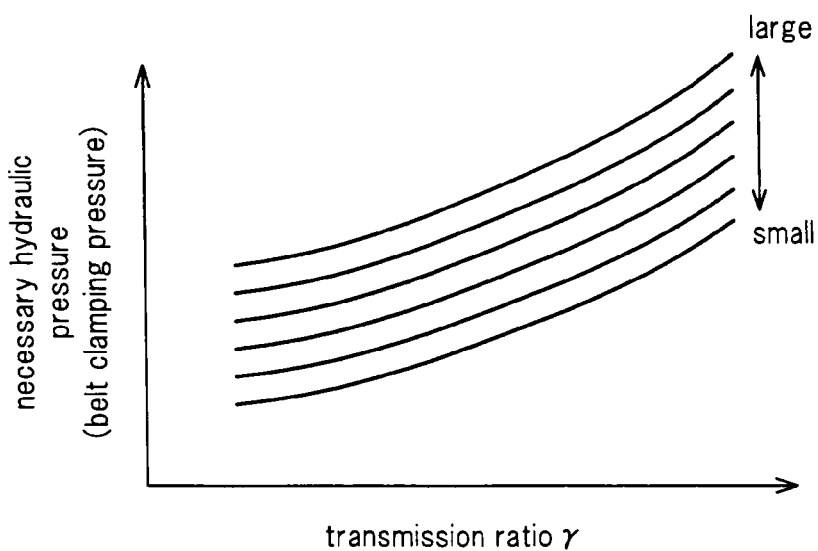
FIG. 5 shows an example of a map used for belt clamping pressure control of the belt-type continuously variable transmission.

In this example, for example as shown in FIG. 5, the control hydraulic pressure output by the linear solenoid (SLS) 202 is controlled according to a map of necessary hydraulic pressure (corresponding to belt clamping pressure) that has been preset such that belt slippage does not occur, using an accelerator opening degree Acc that corresponds to transmitted torque and the transmission ratio $\gamma$ ($\gamma$=Nin/Nout) as parameters, and thus the belt clamping pressure of the belt-type continuously variable transmission 4 is controlled. That is, the belt clamping pressure of the belt-type continuously variable transmission 4 is controlled by adjusting/controlling the hydraulic pressure of the hydraulic actuator 423 of the secondary pulley 42. The map in FIG. 5 corresponds to clamping pressure control conditions, and is stored in the ROM 82 of the ECU 8 (see FIG. 6).

—ECU—

Figure 6:
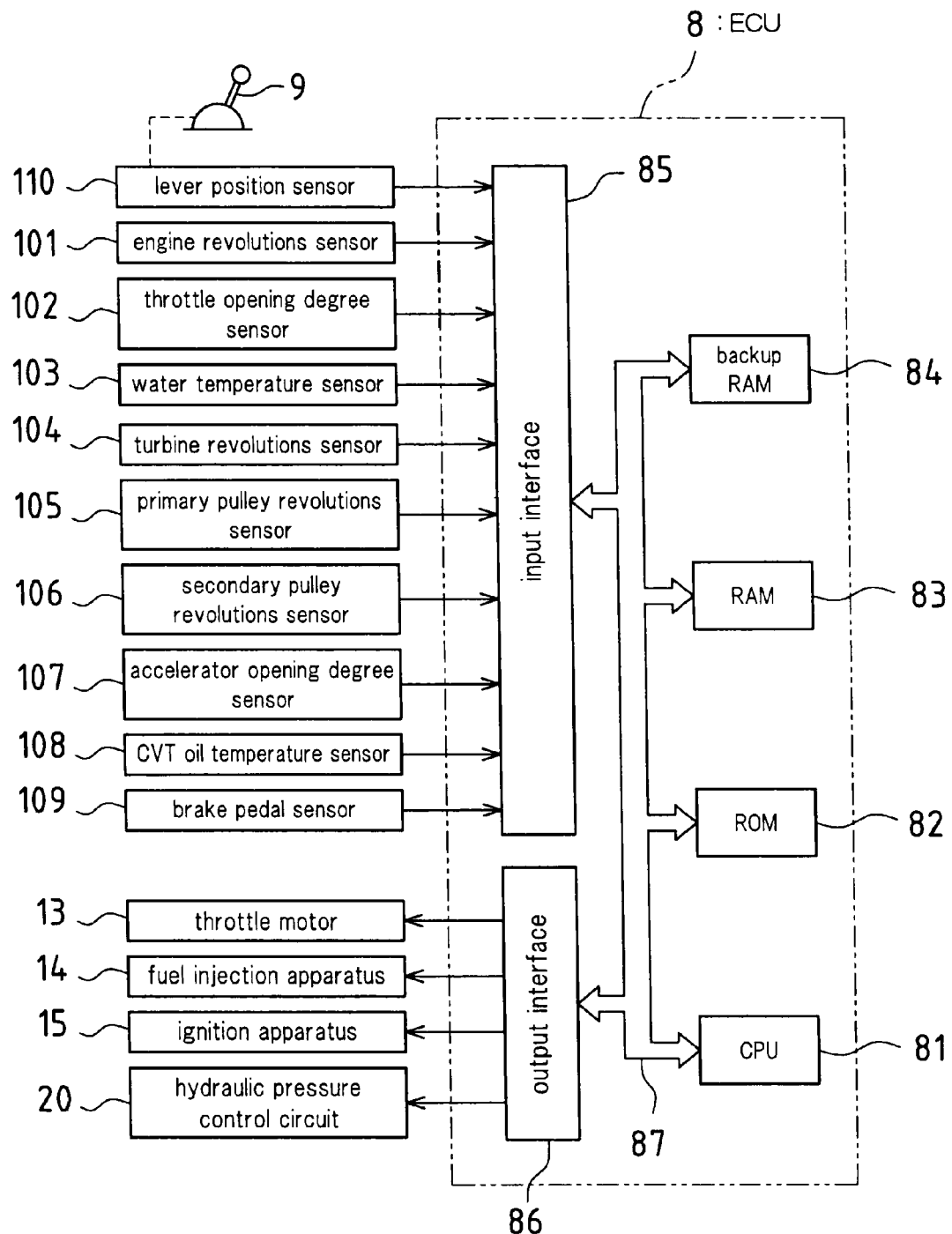
FIG. 6 is a block diagram that shows the configuration of a control system such as an ECU.

As shown in FIG. 6, the ECU 8 is provided with a CPU 81, the ROM 82, a RAM 83, a backup RAM 84, and so on.

Various control programs, maps referred to when executing those various programs, and the like are stored in the ROM 82. The CPU 81 executes various computational processes based on the various control programs and maps stored in the ROM 82. The RAM 83 is a memory that temporarily stores results of computation by the CPU 81, data that has been input from various sensors, and the like. The backup RAM 84 is a nonvolatile memory that stores data to be saved when the engine 1 is stopped, or the like.

The CPU 81, the ROM 82, the RAM 83, and the backup RAM 84 are connected to each other via a bus 87, and are connected to an input interface 85 and an output interface 86.

The engine revolutions sensor 101, a throttle opening degree sensor 102, a water temperature sensor 103, a turbine revolutions sensor 104, the primary pulley revolutions sensor 105, the secondary pulley revolutions sensor 106, an accelerator opening degree sensor 107, a CVT oil temperature sensor 108, a brake pedal sensor 109, a lever position sensor 110 that detects the lever position (operation position) of a shift lever 9, and so on are connected to the input interface 85 of the ECU 8. Output signals of those respective sensors, i.e., signals that indicate, for example, engine 1 revolutions (engine revolutions) Ne, throttle valve 12 throttle opening degree θth, engine 1 coolant water temperature Tw, turbine shaft 27 revolutions (turbine revolutions) Nt, primary pulley revolutions (input shaft revolutions) Nin, secondary pulley revolutions (output shaft revolutions) Nout, accelerator pedal operation amount (accelerator opening degree) Acc, hydraulic pressure control circuit 20 oil temperature (CVT oil temperature Thc), whether or not a foot brake that is an ordinary brake is operated (brake ON/OFF), shift lever 9 lever position (operation position), and so on are supplied to the ECU 8.

The throttle motor 13, a fuel injection apparatus 14, an ignition apparatus 15, the hydraulic pressure control circuit 20 (lockup control circuit 200), and so on are connected to the output interface 86.

Here, among the signals supplied to the ECU 8, the turbine revolutions Nt matches the primary pulley revolutions (input shaft revolutions) Nin during forward travel in which the forward clutch C1 of the forward/rearward travel switching apparatus 3 is engaged, and the secondary pulley revolutions (output shaft revolutions) Nout correspond to the vehicle speed V. Also, the accelerator operation amount Acc indicates the driver's requested output amount.

The shift lever 9 is selectively operated to respective positions such as a parking position 'P' for parking the vehicle, a reverse position 'R' for rearward travel, a neutral position 'N' where power transmission is blocked, a drive position 'D' for forward travel, a manual position 'M' where it is possible to use a manual operation to increase or reduce the transmission ratio γ of the belt-type continuously variable transmission 4 during forward travel, and so on.

In the manual position 'M', a downshift position and an upshift position for increasing or decreasing the transmission ratio γ, or alternatively, a plurality of range positions where it is possible to select from a plurality of transmission ranges with differing upper limits (side where the transmission ratio γ is small) of a transmission range, or the like are provided.

The lever position sensor 110, for example, is provided with a plurality of ON/OFF switches or the like that detect that the shift lever 9 has been operated to the parking position 'P', the reverse position 'R', the neutral position 'N', the drive position 'D', the manual position 'M', the upshift position or the downshift position, or a range position, and so on. Note that in order to change the transmission ratio γ with a manual operation, it is also possible to provide, separate from the shift lever 9, a downshift switch and an upshift switch, or a lever or the like, on a steering wheel or the like.

Based on the above output signals of the various sensors and the like, the ECU 8 executes output control of the engine 1, the above transmission speed control and belt clamping pressure control of the belt-type continuously variable transmission 4, engagement/release control of the lockup clutch 24, and so on. Further, the ECU 8 executes a solenoid abnormalcy/normalcy determination process described below.

Output control of the engine 1 is executed using the throttle motor 13, the fuel injection apparatus 14, the ignition apparatus 15, the ECU 8, and so on.

—Solenoid Abnormalcy/Normalcy Determination Process—

First, in the hydraulic pressure control circuits shown in FIGS. 2 and 3, when there was an ON failure of the linear solenoid (SLT) 201, the primary regulator valve 203 is set to the closed side, and the line pressure PL is fixed at the necessary minimum hydraulic pressure (minimum pressure during solenoid failure) PLmin. Alternatively, when there was an ON failure of the linear solenoid (SLS) 202, the belt clamping pressure control valve 303 is set to the closed side, and the line pressure PL is fixed at a hydraulic pressure (minimum pressure during solenoid failure) PBmin for insuring the minimum belt clamping pressure. However, for a reason such as that the line pressure PL is also used for other than belt clamping pressure control, the hydraulic pressure PLmin fixed when there was an ON failure of the linear solenoid (SLT) 201 is set to greater than the hydraulic pressure PBmin fixed when there was an ON failure of the linear solenoid (SLS) 202 (PLmin>PBmin).

Here, in a conventional normalcy determination process, as described above, the normalcy determination threshold value is set by adding a margin for solenoid hardware variation, preventing erroneous determination, and the like to the input torque value that is allowable at the minimum pressure during solenoid failure (for example, the minimum pressure during failure of the linear solenoid (SLT) 201), so the normalcy determination threshold value becomes a high value. Therefore, during ordinary running after a failure (abnormalcy) determination, the present input torque (actual input torque) of the belt-type continuously variable transmission 4 might not exceed the normalcy determination threshold value, so that it will not be possible to execute the normalcy determination process.

In consideration of such points, in this example, after a failure (abnormalcy) determination, the input torque that is allowable at the minimum pressure during solenoid failure is not used for a condition when performing the normalcy determination, rather, the actual input torque of the belt-type continuously variable transmission during belt slippage (during failure determination) is used for a condition when performing the normalcy determination, so the normalcy determination can be reliably performed after a solenoid failure.

Figure 7:
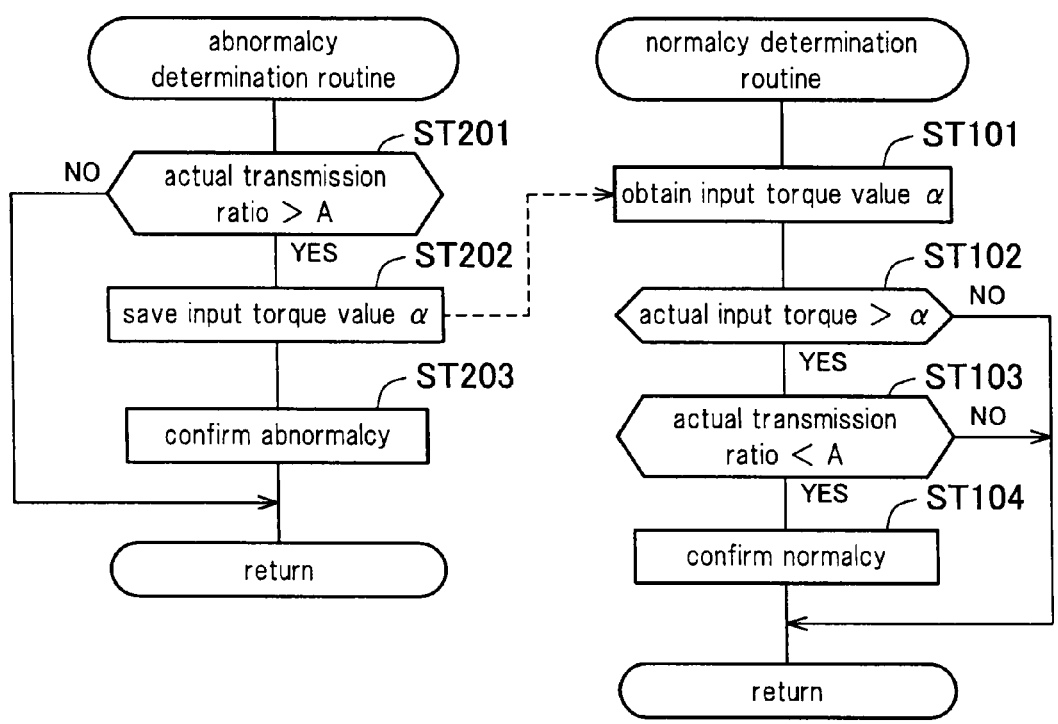
FIG. 7 is a flowchart that shows an example of respective control routines of a normalcy determination process and an abnormalcy determination process executed by the ECU.

A specific example of such a case will be described with reference to the flowchart in FIG. 7. FIG. 7 illustrates both the abnormalcy determination process (solenoid failure determination process) and the normalcy determination process. The normalcy determination routine and the abnormalcy determination routine are executed in the ECU 8.

First, in the abnormalcy determination routine, in Step ST201, the actual transmission ratio (actual transmission ratio=Nin/Nout) is obtained from the primary pulley revolutions Nin and the secondary pulley revolutions Nout, and it is determined whether or not that actual transmission ratio is greater than a predetermined determination value A. When the result of the determination in Step ST201 is negative (actual transmission ratio≦A), a determination of normalcy is made and the routine returns.

When the result of the determination in Step ST201 is affirmative (actual transmission ratio>A), a determination that slippage is occurring is made and the routine proceeds to Step ST202. In Step ST202, the present input torque is extracted, and an input torque value α of that input torque is saved. Further, when the result of the determination in Step ST201 is affirmative, a determination is made that some abnormalcy (for example, failure of the linear solenoid (SLT) 201 or the linear solenoid (SLS) 202, or valve sticking of the transmission control valve 302 or 303, and so on) is occurring, and 'abnormalcy' is confirmed (Step ST203).

Also, in the above abnormalcy determination routine, the determination value A for the actual transmission ratio is a determination value that determines whether or not there is belt slippage, and a value is set that is on the low side from the transmission ratio γmax in the map shown in FIG. 4.

The input torque can be calculated based on an engine torque Te, a torque ratio t of the torque converter 2, and input inertia torque. Here, the engine torque Te can be calculated, for example, from the throttle opening degree θth and the engine revolutions Ne. The torque ratio t is a function of [primary pulley revolutions (input shaft revolutions) Nin/engine revolutions Ne], and the input inertia torque can be calculated from the amount of change over time of the primary pulley revolutions (input shaft revolutions) Nin.

On the other hand, the normalcy determination routine in FIG. 7 is executed after solenoid abnormalcy (failure) has been confirmed, and in Step ST101, the input torque value α saved in Step ST202 of the above abnormalcy determination process is obtained.

Next, in Step ST102, the present input torque (actual input torque) of the belt-type continuously variable transmission 4 is calculated, and it is determined whether or not that actual input torque is greater than the input torque value α obtained in Step ST101. When the result of the determination in Step ST102 is negative (actual input torque≦α), the routine returns (the abnormalcy determination continues). When the result of the determination in Step ST101 is affirmative (input torque>α), the routine proceeds to Step ST103.

In Step ST103, the actual transmission ratio (actual transmission ratio=Nin/Nout) is obtained from the primary pulley revolutions Nin and the secondary pulley revolutions Nout, and it is determined whether or not that actual transmission ratio is less than the above predetermined determination value A. When the result of the determination in Step ST103 is negative (actual transmission ratio≧A), it is determined that belt slippage is occurring and the routine returns (the abnormalcy determination continues).

When the result of the determination in Step ST103 is affirmative (actual transmission ratio<A), i.e., when belt slippage is not occurring, for example, a determination is made the abnormalcy such as valve sticking has been eliminated, and 'normalcy' is confirmed (normalcy return determination: Step ST104). When the normalcy return determination is thus performed, the 'abnormalcy determination' is cleared.

As described above, according to the determination control of this example, the input torque when belt slippage has actually occurred, i.e., when a failure is determined, is used as a condition when performing the normalcy determination, so in comparison to a conventional normalcy determination process, it is possible to adopt a smaller normalcy determination threshold value (input torque value α) to be used for the normalcy return determination. Therefore, even during ordinary running, the actual input torque of the belt-type continuously variable transmission 4 exceeds the normalcy determination threshold value, so it is possible to accurately perform a normalcy determination. Thus, it is possible to reliably clear the abnormalcy determination after a failure has been determined.

As for the normalcy determination threshold value used for the normalcy determination, as described above, the actual input torque value α when belt slippage is occurring may be used, or a value obtained by adding a margin for preventing erroneous determination to that input torque value α may be used.

Embodiment 2

Next is a description of another embodiment of the invention, with reference to the drawings.

Figure 8:
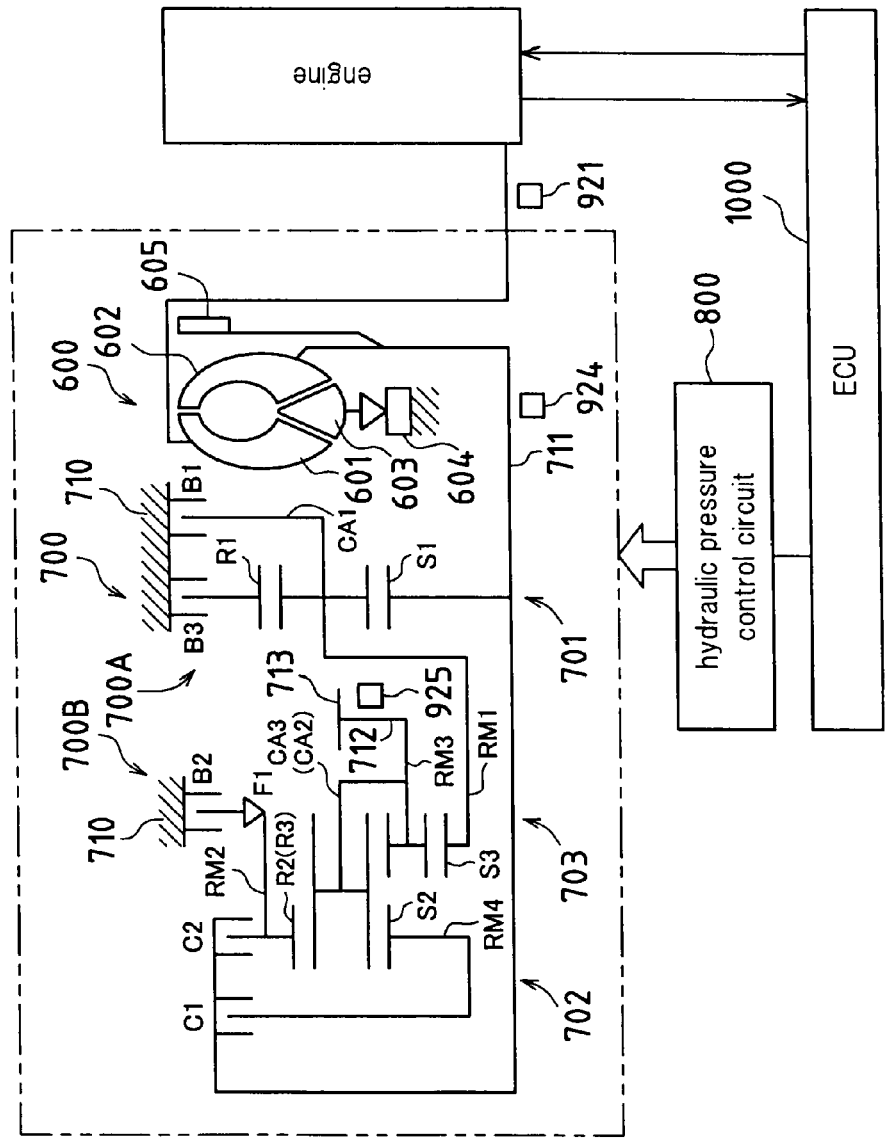
FIG. 8 is a schematic configuration view that shows another example of an automatic transmission in which the present invention is applied.
Figure 10:
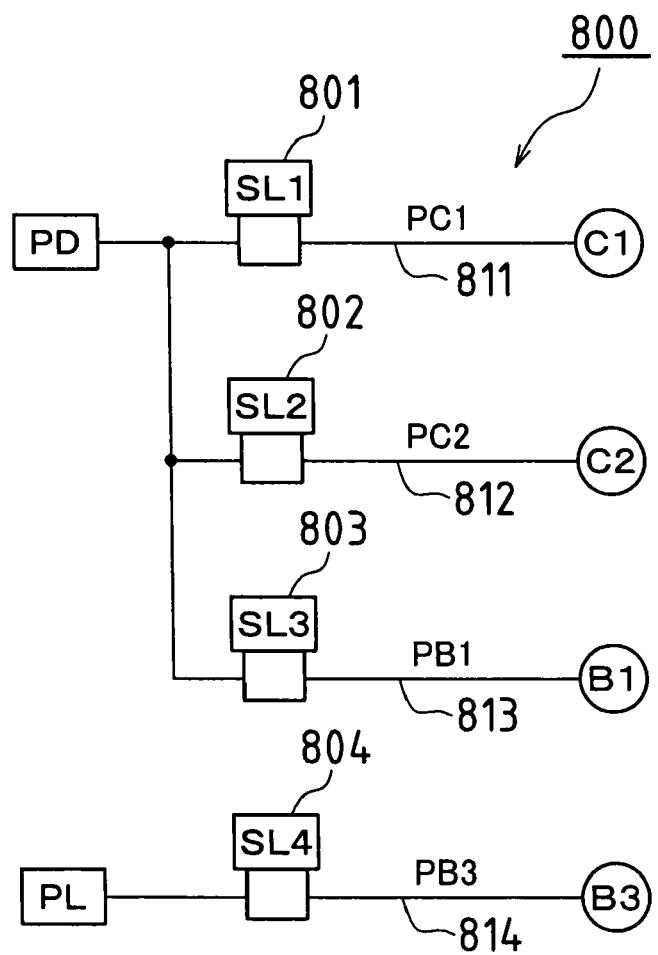
FIG. 10 is a circuit configuration diagram that shows part of the hydraulic pressure control circuit of the automatic transmission shown in FIG. 8.

FIG. 8 is a schematic configuration view that shows an example for a multi-speed automatic transmission (including a torque converter) in which the invention is applied. The automatic transmission 700 in this example is mounted in an FF (front engine/front drive)-type vehicle.

First, a torque converter 600 is provided with an input shaft side pump impeller 601, an output shaft side turbine runner 602, a stator 603 that realizes a torque amplification function, and a one-way clutch 604, and transmits power between the pump impeller 601 and the turbine runner 602 via a fluid.

In the torque converter 600, a lockup clutch 605 is provided that puts the input side and the output side of the torque converter 600 in a directly linked state. By completely engaging the lockup clutch 605, the pump impeller 601 and the turbine runner 602 rotate as a single body. Alternatively, by engaging the lockup clutch 605 in a predetermined slippage state, the turbine runner 602 rotates following the pump impeller 601 with a predetermined slippage amount during driving.

The automatic transmission 700 is a planetary gear-type multi-speed transmission having, on a coaxial line, a first transmission unit 700A that is configured mainly from a single pinion-type first planetary gear apparatus 701, and a second transmission unit 700B that is configured mainly from a single pinion-type second planetary gear apparatus 702 and a double pinion-type third planetary gear apparatus 703. The automatic transmission 700 changes the revolution speed of an input shaft 711, transmits the changed revolution to an output shaft 712, and outputs that revolution from an output gear 713. The output gear 713 is linked to a differential gear apparatus mounted in the vehicle either directly or via a counter shaft. The automatic transmission 700 and the torque converter 600 are configured approximately symmetrically relative to a center line, so in FIG. 8, the lower half of the center line is omitted.

The first planetary gear apparatus 701 that constitutes the first transmission unit 700A is provided with three rotating elements: a sun gear S1, a carrier CA1, and a ring gear R1. The sun gear S1 is linked to the input shaft 711. Further, due to the ring gear R1 being fixed to a housing case 710 via a third brake B3, the sun gear S1 rotates in a decelerated manner relative to the input shaft 711, with the carrier CA1 as an intermediate output member.

In the second planetary gear apparatus 702 and the third planetary gear apparatus 703 that constitute the second transmission unit 700B, four rotating elements RM1 to RM4 are configured so that parts of the four rotating elements RM1 to RM4 are linked to each other.

Specifically, the first rotating element RM1 is configured with a sun gear S3 of the third planetary gear apparatus 703, and the second rotating element RM2 is configured with a ring gear R2 of the second planetary gear apparatus 702 and a ring gear R3 of the third planetary gear apparatus 703 linked to each other. Further, the third rotating element RM3 is configured with a carrier CA2 of the second planetary gear apparatus 702 and a carrier CA3 of the third planetary gear apparatus 703 linked to each other. Also, the fourth rotating element RM4 is configured with a sun gear S2 of the second planetary gear apparatus 702.

The second planetary gear apparatus 702 and the third planetary gear apparatus 703 are configured with the carriers CA2 and CA3 as shared members, and with the ring gears R2 and R3 as shared members. Further, the second planetary gear apparatus 702 and the third planetary gear apparatus 703 are configured as a Ravigneaux planetary gear set in which the pinion gear of the second planetary gear apparatus 702 also serves as a second pinion gear of the third planetary gear apparatus 703.

The first rotating element RM1 (sun gear S3) is linked as a single body to the carrier CA1 of the first planetary gear apparatus 701 that is an intermediate output member, and is stopped from rotating by being selectively linked to a housing case 710 with a first brake B1. The second rotating element RM2 (ring gears R2 and R3) is selectively linked to the input shaft 711 via a second clutch C2, and is stopped from rotating by being selectively linked to the housing case 710 via a one-way clutch F1 and the second brake B2.

The third rotating element RM3 (carriers CA2 and CA3) are linked as a single body to the output shaft 712. The fourth rotating element RM4 (sun gear S2) is selectively linked to the input shaft 711 via a first clutch C1.

In the above automatic transmission 2, the gear is set by the first clutch C1, the second clutch C2, the first brake B1, the second brake B2, the third brake B3, the one-way clutch F1, and so on, which are frictionally engaging elements, being engaged or released in a predetermined state.

FIG. 9 is an engagement table that illustrates engagement operation of the clutches and brakes in order to establish each gear of the automatic transmission 700. 'Y' indicates engagement, and 'N' indicates release.

As shown in FIG. 9, when the clutch C1 of the automatic transmission 700 is engaged, a forward gear 1 (1st) is established, and in this first gear the one-way clutch F1 is engaged. When the first clutch C1 and the brake B1 are engaged, a forward gear 2 (2nd) is established. When the first clutch C1 and the third brake B3 are engaged, a forward gear 3 (3rd) is established.

When the first clutch C1 and the second clutch C2 are engaged, a forward gear 4 (4th) is established. When the second clutch C2 and the third brake B3 are engaged, a forward gear 5 (5th) is established. When the second clutch C2 and the first brake B1 are engaged, a forward gear 6 (6th) is established. On the other hand, when the second brake B2 and the third brake B3 are engaged, a reverse gear (Rev) is established.

Revolutions of the input shaft 711 of the above automatic transmission 700 are detected with an input shaft revolutions sensor 924. Revolutions of the output shaft 712 of the automatic transmission 700 are detected with an output shaft revolutions sensor 925. Based on a revolutions ratio (output revolutions/input revolutions) obtained from the output signals of the input shaft revolutions sensor 924 and the output shaft revolutions sensor 925, it is possible to determine the present gear of the automatic transmission 700.

Next is a description of a hydraulic pressure control circuit 800 of the automatic transmission 700.

The hydraulic pressure control circuit 800 in this example is provided with a linear solenoid (SL1) 801 for controlling engagement/release of the first clutch C1, a linear solenoid (SL2) 802 for controlling engagement/release of the second clutch C2, a linear solenoid (SL3) 803 for controlling engagement/release of the first brake B1, and a linear solenoid (SL4) 804 for controlling engagement/release of the third brake B3.

The linear solenoid (SL1) 801 generates a first hydraulic pressure PC1 for controlling the engagement state of the first clutch C1, using a D range pressure PD output from an unshown manual valve as source pressure, and outputs that first hydraulic pressure PC1 to a first oil path 811 that connects to a hydraulic pressure servo of the first clutch C1. The linear solenoid (SL2) 802 generates a second hydraulic pressure PC2 for controlling the engagement state of the second clutch C2, using the D range pressure PD as source pressure, and outputs that second hydraulic pressure PC2 to a second oil path 812 that connects to a hydraulic pressure servo of the second clutch C2.

The linear solenoid (SL3) 803 generates a third hydraulic pressure PB1 for controlling the engagement state of the first brake B1, using the D range pressure PD as source pressure, and outputs that third hydraulic pressure PB1 to a third oil path 813 that connects to a hydraulic pressure servo of the first brake B1. The linear solenoid (SL4) 804 generates a fourth hydraulic pressure PB3 for controlling the engagement state of the third brake B3, using the line pressure PL as source pressure, and outputs that fourth hydraulic pressure PB3 to a fourth oil path 814 that connects to a hydraulic pressure servo of the third brake B3.

The above linear solenoid (SL1) 801, linear solenoid (SL2) 802, linear solenoid (SL3) 803, linear solenoid (SL4) 804, and so on are controlled by the ECU 1000.

—ECU—

The ECU 1000, like the ECU 8 shown in FIG. 6, is provided with a CPU, a ROM, a RAM, a backup RAM, an input/output interface, and so on.

Figure 11:
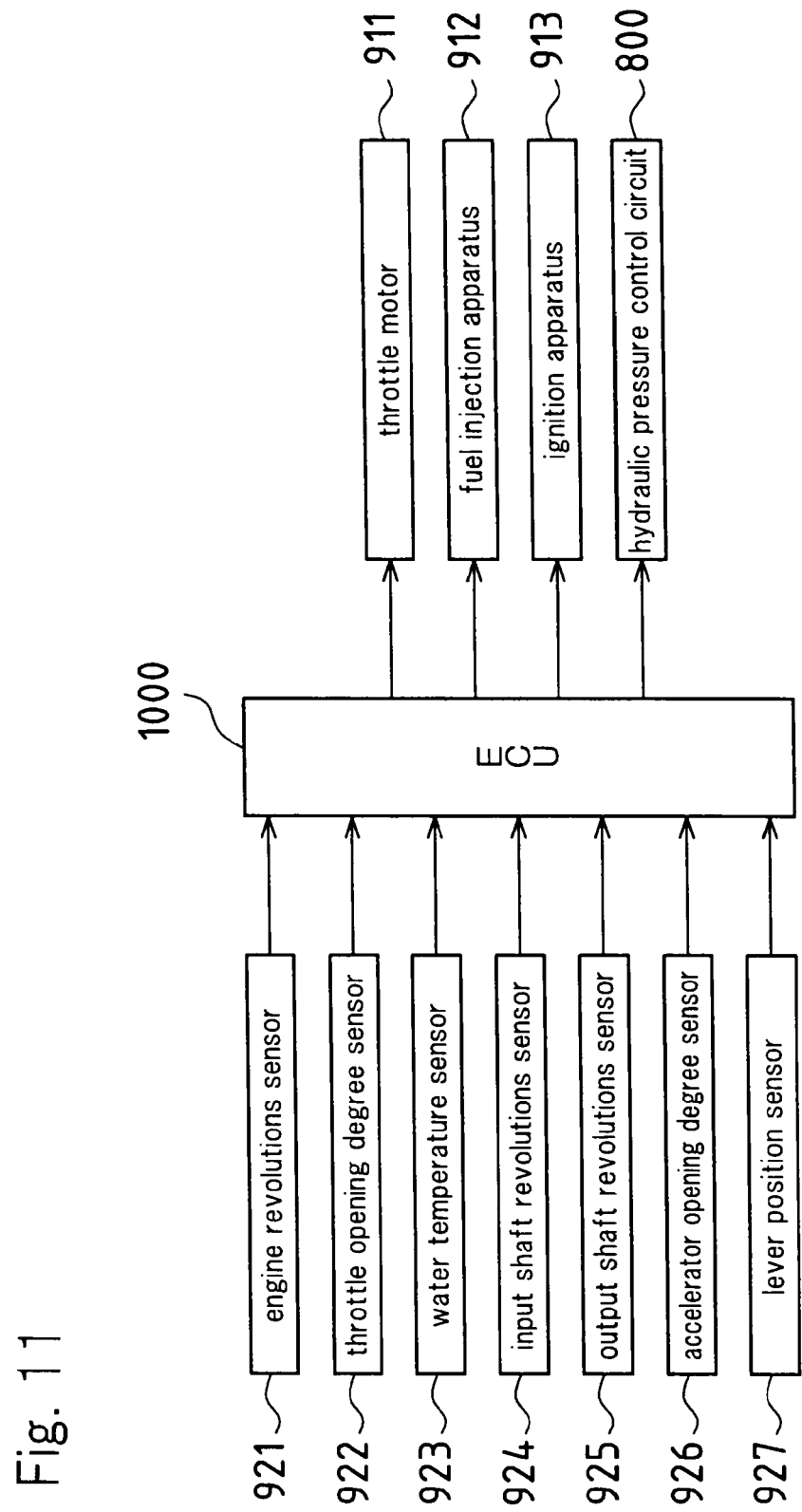
FIG. 11 is a block diagram that shows another configuration of a control system such as an ECU.

As shown in FIG. 11, an engine revolutions sensor 921, a throttle opening degree sensor 922, a water temperature sensor 923, an input shaft revolutions (turbine revolutions) sensor 924, an output shaft revolutions sensor 925, an accelerator opening degree sensor 926, a lever position sensor 927 that detects a lever position (operation position) of a shift lever, and so on are connected to the ECU 1000, and output signals from each of those sensors are input to the ECU 1000. Also, an engine throttle motor 911, a fuel injection apparatus 912, an ignition apparatus 913, the hydraulic pressure control circuit 800, and so on are connected to the ECU 1000.

The ECU 1000 outputs a solenoid control signal to the hydraulic pressure control circuit 800. The linear solenoids 801 to 804 and so on of the hydraulic pressure control 800 are controlled based on this solenoid control signal so that the first clutch C1, the second clutch C2, the first brake B1, the second brake B2, the third brake B3, the one-way clutch F1, and so on of the automatic transmission 700 are engaged or released in a predetermined state so as to establish a predetermined gear (gear 1 to gear 6). Also, the ECU 1000 executes the below 'gearshift control'.

—Transmission Control (Gearshift Control)—

Figure 12:
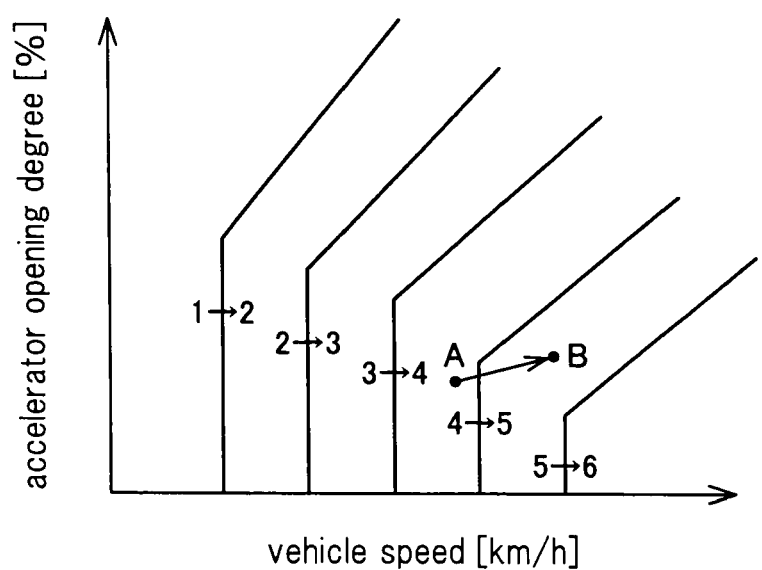
FIG. 12 shows an example of a gearshift map used for gearshift control.

First is a description of a gearshift map used for the gearshift control in this example, with reference to FIG. 12.

In the gearshift map shown in FIG. 12, using the vehicle speed and accelerator opening degree as parameters, a plurality of regions have been set for obtaining a proper gear according to the vehicle speed and the accelerator opening degree, and this gearshift map is stored in the ROM of the ECU 1000. The regions of the gearshift map are delineated by a plurality of gearshift lines (gear switching lines). Note that in the gearshift map in FIG. 12, only upshift gearshift lines are shown.

Next is a description of the basic operation of the gearshift control.

The ECU 1000 calculates the vehicle speed from the output signal of the output shaft revolutions sensor 925, calculates the accelerator opening degree from the output signal of the accelerator opening degree sensor 926, and refers to the gearshift map in FIG. 12 to calculate a target gear based on the calculated vehicle speed and accelerator opening degree. Further, the present gear is determined by obtaining the revolutions ratio (output revolutions/input revolutions) obtained from the output signals of the input shaft revolutions sensor 924 and the output shaft revolutions sensor 925, and by comparing the present gear to the target gear, a determination is made as to whether or not a gearshift operation is necessary.

From the result of that determination, when gearshifting is not necessary (when the present gear and the target gear are the same, so the gear is already appropriately set), a solenoid control signal (hydraulic pressure command signal) that maintains the present gear is output to the hydraulic pressure control circuit 800 of the automatic transmission 700.

On the other hand, when the present gear and the target gear are different, gearshift control is performed. For example, in a case where, from a condition of running in a state with the automatic transmission 700 in fourth gear, the running state of the vehicle changes, and so for example there is a change from point PA to point PB in FIG. 12, the change crosses over the upshift gearshift line '4→5', so the target gear calculated from the gearshift map becomes fifth gear, and a solenoid control signal (hydraulic pressure command signal) that sets fifth gear is output to the hydraulic pressure control circuit 800 of the automatic transmission 700. Thus, a gearshift from fourth gear to fifth gear (4→5 upshift) is performed.

—Normalcy Determination Process—

Also in the controller for the automatic transmission 700 in this example, by adopting the input torque when clutch slippage (frictionally engaging element slippage) has actually occurred, i.e., the input torque when a failure has been determined, as a condition for normalcy determination, it is possible for the normalcy determination threshold value used for the normalcy determination to be a small value.

Specifically, for example, based on the output signals of the input shaft revolutions sensor 924 and the output shaft revolutions sensor 925, the actual gear ratio (gear ratio=input shaft revolutions/output shaft revolutions) in a specific transmission (for example, first gear) is calculated. Next, a determination is made as to whether or not that calculated actual gear ratio is larger than a predetermined determination value B. When the actual gear ratio is larger than the determination value B, a determination is made that clutch slippage (slippage of the first clutch C1) is occurring, the input torque of the automatic transmission 700 is obtained, and by using that input torque value as a condition when performing the normalcy determination, it is possible for the normalcy determination threshold value to be a small value. In this example as well, if there is no clutch slippage, when a greater torque than the normalcy determination threshold value (input torque value) has been input to the automatic transmission 700, a determination is made that the solenoid is in a normal state (for example, the linear solenoid (LS1) 801 is in a normal state).

The above determination value B is obtained and set via experimentation/calculation and so forth of the gear ratio when clutch slippage (for example, slippage of the first clutch C1) occurs in a specific gear (for example, first gear). The input torque, as in above Embodiment 1, is calculated based on engine torque, the torque ratio of the torque converter 600, and the input inertia torque.

Other Embodiments

In the above examples, the invention was applied to the controller for an automatic transmission of a vehicle in which a gasoline engine has been mounted, but this is not a limitation; the invention is also applicable to the controller for an automatic transmission of a vehicle in which another engine, such as a diesel engine, has been mounted. Also, other than an engine (internal combustion engine), the power source of the vehicle may be an electric motor or alternatively a hybrid power source provided with both an engine and an electric motor.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2007-321966 filed in Japan on Dec. 13, 2007, the entire contents of which are herein incorporated by reference.

INDUSTRIAL APPLICABILITY

The present invention is not limited to FF (front engine/front drive) type vehicles, and is applicable to FR (front engine/rear drive) type vehicles and four wheel drive vehicles.

The invention claimed is:

1. A controller for an automatic transmission having a solenoid valve that controls a hydraulic pressure of a transmission unit, the controller for automatic transmission comprising:
    slippage determination means for determining slippage of a drive force transmission element of the transmission unit;
    input torque calculation means for calculating input torque of the automatic transmission;
    normalcy determination means for determining normalcy of the solenoid valve based on the input torque calculated by the input torque calculation means during the slippage of the drive force transmission element;
    abnormalcy determination means for determining abnormalcy during the slippage of the drive force transmission element; and
    input torque extraction means for extracting the input torque during the slippage of the drive force transmission element, wherein
    after the abnormalcy determination is made, when no slippage of the drive force transmission element is determined, and a greater torque than the input torque during the slippage of the drive force transmission element is input to the automatic transmission, the normalcy determination means determines that the solenoid valve is in a normal state.

2. The controller for automatic transmission according to claim 1,
wherein the automatic transmission is a belt-type continuously variable transmission having a primary pulley and a secondary pulley, a belt wrapped around the primary pulley and the secondary pulley, a hydraulic actuator that changes a groove width of the primary pulley, a hydraulic actuator that changes a groove width of the secondary pulley, and a solenoid valve that controls the hydraulic pressure supplied to the hydraulic actuator of the secondary pulley; and
in the controller for automatic transmission, the slippage determination means determines whether or not there is belt slippage of the belt-type continuously variable transmission, the input torque calculation means calculates input torque of the belt-type continuously variable transmission, and the normalcy determination means determines normalcy of the solenoid valve based on the input torque calculated during belt slippage.

3. The controller for automatic transmission according to claim 2, wherein the slippage determination means calculates a transmission ratio between the primary pulley and the secondary pulley, and determines whether or not there is belt slippage based on the calculated transmission ratio.

4. The controller for automatic transmission according to claim 2, wherein the slippage determination means calculates a transmission ratio between the primary pulley and the secondary pulley, and determines whether or not there is belt slippage based on the calculated transmission ratio.

5. The controller for automatic transmission according to claim 1,
wherein the automatic transmission is a multi-speed automatic transmission having a transmission unit that establishes a plurality of gears having different gear ratios by selectively engaging a plurality of frictionally engaging elements, and a solenoid valve that controls an engagement pressure of the frictionally engaging elements, and
in the controller for automatic transmission, the slippage determination means determines whether or not there is slippage of a frictionally engaging element of the multi-speed automatic transmission, the input torque calculation means calculates input torque of the multi-speed automatic transmission, and the normalcy determination means determines normalcy of the solenoid valve based on the input torque calculated during slippage of the frictionally engaged element.

6. The controller for automatic transmission according to claim 5, wherein the slippage determination means calculates a gear ratio based on input shaft revolutions and output shaft revolutions of the multi-speed automatic transmission, and determines whether or not there is slippage of the frictionally engaging element based on the calculated gear ratio.

7. The controller for automatic transmission according to claim 5, wherein the slippage determination means calculates a gear ratio based on input shaft revolutions and output shaft revolutions of the multi-speed automatic transmission, and determines whether or not there is slippage of the frictionally engaging element based on the calculated gear ratio.

* * * * *